(12) United States Patent
Norman, Jr.

(10) Patent No.: US 8,645,114 B1
(45) Date of Patent: Feb. 4, 2014

(54) DATA POINT AVERAGING FOR COMPUTATIONAL FLUID DYNAMICS DATA

(75) Inventor: David Norman, Jr., Houston, TX (US)

(73) Assignee: The Boeing Company, Chicago, IL (US)

( * ) Notice: Subject to any disclaimer, the term of this patent is extended or adjusted under 35 U.S.C. 154(b) by 566 days.

(21) Appl. No.: 12/899,018

(22) Filed: Oct. 6, 2010

(51) Int. Cl.
*G06G 7/48* (2006.01)
(52) U.S. Cl.
USPC .................................... 703/9; 703/6
(58) Field of Classification Search
USPC ........................................ 703/6–9
See application file for complete search history.

(56) References Cited

U.S. PATENT DOCUMENTS

| | | | | |
|---|---|---|---|---|
| 5,065,630 | A * | 11/1991 | Hadcock et al. | 73/802 |
| 7,120,544 | B2 * | 10/2006 | Duncan | 702/50 |
| 7,401,304 | B2 * | 7/2008 | Li et al. | 716/111 |
| 7,912,681 | B2 * | 3/2011 | Narramore et al. | 703/1 |
| 2008/0159542 | A1 * | 7/2008 | Ito et al. | 380/279 |

OTHER PUBLICATIONS

Taylor, "CFD Data Transfer to Structural Analysis", Sverdrup Technology, Inc., Huntsville, Alabama, pp. 1-19, retrieved Oct. 14, 2010 http://www.mscsoftware.com/support/library/conf/wuc96/04a_tayl.pdf.
Anderson, "Computational Fluid Dynamics", 1995, McGraw-Hill Science.
"zPOD Information", pp. 1-8, retrieved Oct. 14, 2010 zonatech.com?ZPODInformation.htm.

* cited by examiner

*Primary Examiner* — Omar Fernandez Rivas
*Assistant Examiner* — Herng-Der Day
(74) *Attorney, Agent, or Firm* — Yee & Associates, P.C.

(57) ABSTRACT

A system and method for generating fluid flow parameter data for use in aerodynamic heating analysis. Computational fluid dynamics data is generated for a number of points in an area on a surface to be analyzed. Sub-areas corresponding to areas of the surface for which an aerodynamic heating analysis is to be performed are identified. A computer system automatically determines a sub-set of the number of points corresponding to each of the number of sub-areas and determines a value for each of the number of sub-areas using the data for the sub-set of points corresponding to each of the number of sub-areas. The value is determined as an average of the data for the sub-set of points corresponding to each of the number of sub-areas. The resulting parameter values then may be used to perform an aerodynamic heating analysis.

5 Claims, 6 Drawing Sheets

- 900 — IDENTIFY DATA
- 902 — IDENTIFY SUB-AREAS
- 904 — DETERMINE SUB-SET OF POINTS IN EACH SUB-AREA
- 906 — DETERMINE VALUES FOR EACH SUB-AREA USING DATA FOR SUB-SETS OF POINTS
- 908 — SAVE VALUES
- 910 — USE VALUES FOR AERODYNAMIC HEATING ANALYSIS

FIG. 10

- 1000 — OBTAIN SURFACE CONDITION INFORMATION
- 1002 — CALCULATE AVERAGE COMPUTATIONAL FLUID DYNAMICS VALUES
- 1004 — GENERATE AERODYNAMIC HEATING ANALYSIS DATA FOR SURFACE CONDITIONS USING AVERAGE VALUES
- 1006 — CHANGE SURFACE RESPONSIVE TO AERODYNAMIC HEATING ANALYSIS

DATA POINT AVERAGING FOR COMPUTATIONAL FLUID DYNAMICS DATA

GOVERNMENT LICENSE RIGHTS

This invention was made with Government support under Boeing subcontract 6000132079 awarded by United Space Alliance under prime contract NNJ06VA01C awarded by NASA. The Government has certain rights in this invention.

BACKGROUND INFORMATION

1. Field

The present disclosure relates generally to systems and methods for generating data by a computer simulation of a flow of fluid over a surface, and more particularly to systems and methods for generating such data for sub-areas of a surface from data generated for a number of points on an area of the surface.

2. Background

Computational fluid dynamics is a branch of fluid dynamics. Computational fluid dynamics uses numerical methods and algorithms to solve and analyze problems that involve fluid flows. For example, computers may be used to perform the calculations required to simulate the interaction of liquids and gasses with a surface defined by boundary conditions. The result of these calculations may be data for a number of points in an area of the surface. For example, the area of the surface may be a two-dimensional planar area of the surface. Data generated for the number of points may include values for various properties related to fluid flow over the surface. For example, such properties may include temperature, pressure, heat flux, velocity, and other properties.

Aerodynamic heating is the heating of a solid body produced by the frictional interactions and passage of fluid about the body. Aerodynamic heating analysis may be performed by a computer using a thermal model of the body and computational fluid dynamics data describing the properties of fluid flows across the body.

Aerodynamic heating of aerospace vehicles is of particular interest. For example, aerospace vehicles may include aircraft and spacecraft that are designed to reenter the atmosphere. Aerodynamic heating occurs when air passes over an aerospace vehicle during vehicle transit, ascent, descent, and reentry. Aerodynamic heating of an aerospace vehicle is a function of various factors. For example, aerodynamic heating of an aerospace vehicle is a function of such factors as reentry angle, speed, air density, thermal protection system material properties, vehicle configuration, and other factors.

Depending on the vehicle configuration and thermal protection system material properties, aerodynamic heating typically increases as the air increases in density and as the air passes more quickly over the vehicle. The increase in the speed at which air passes over the vehicle typically occurs as the speed of the vehicle increases. Aerodynamic heating temperatures encountered during aerospace vehicle transit, ascent, descent, and reentry can range between approximately 600 degrees Celsius ("° C.") and approximately 1930° C., approximately between 600° F. and 3500° F.

The degree of aerodynamic heating experienced by an aerospace vehicle may affect various characteristics of the vehicle. For example, aerodynamic heating considerations may affect the performance of a vehicle, which types of thermal protection system configurations and materials are needed for the vehicle, how often inspections and maintenance are needed, and whether the vehicle should be reconfigured, repaired, and/or replaced.

The effects of aerodynamic heating on a vehicle structure may be controlled to within acceptable limits through the use of a thermal protection system. For example, a thermal protection system may be used on an aerospace vehicle that travels at supersonic, hypersonic, exo-orbital, and exo-atmospheric speeds. A thermal protection system also may be used on a spacecraft that reenters the atmosphere.

For example, a thermal protection system for a space shuttle includes a barrier to protect the space shuttle from aerodynamic heating when the space shuttle renters the atmosphere. The temperatures encountered by the space shuttle during reentry may be about 1650° C. degrees or more. The thermal protection system for the space shuttle includes a material that covers the surface of the space shuttle that is exposed to air during reentry. The thermal protection system may be implemented using various materials. For example, such materials may include one or more of an integrated and integral ceramic matrix composite material (CMC), a polymeric matrix composite material (PMC), and such materials that are clad with ablative and high-temperature coating materials.

In the space shuttle example, the thermal protection system takes the form of tiles that are attached to the surfaces of the space shuttle that are exposed to heating during reentry. For example, these tiles may be located on the lower surface of the space shuttle. Thermal protection system tiles also may be located at other suitable places on the space shuttle. The tiles on the space shuttle are made of an insulating material known to those having knowledge in the relevant arts to be a silca glass fiber material. The many types and configuration of such tiles absorb and radiate heat while minimizing heat load conduction to the aluminum airframe.

Unintended features or anomalies may occur in an aerospace vehicle thermal protection system. For example, such unintended features or anomalies may occur in the thermal protection system tiles, in the materials used to attach the tiles to the space shuttle surface, and in the materials used to seal and fill gaps and channels between the tiles. These unintended features or anomalies may occur as nicks, dings, or scrapes in the tiles and/or as foreign objects embedded in or between the tiles. Such unintended features or anomalies may arise or occur during pre-flight preparation or during operation of aerospace vehicles such as the space shuttle. Such undesirable features or anomalies may affect the aerodynamic characteristics and performance of the thermal protection system. Similar issues may arise in other types of thermal protection systems, using other types of materials, and that are used in other types of aerospace vehicles.

Accordingly, it would be advantageous to have a method and apparatus, which takes into account one or more of the issues discussed above as well as possibly other issues.

SUMMARY

A method and apparatus for generating data for use in aerodynamic heating analysis includes receiving into a computer system an identification of computational fluid dynamic data. The computational fluid dynamic data includes data for a number of points in an area. The data is generated by a computer simulation of a flow of fluid over a surface corresponding to the area. An identification of a number of sub-areas of the area is also received into the computer system. The computer system determines a sub-set of the number of points corresponding to each of the number of sub-areas. The computer system then determines a value for each of the number of sub-areas using the data for the sub-set of points corresponding to each of the number of sub-areas. The value is an average of the data for the sub-set of points corresponding to each of the number of sub-areas.

A method of aerodynamic analysis of a surface includes receiving into a computer system surface condition information from a surface condition detector. Data for a number of points in an area are identified into the computer system. The data is generated by a computer simulation of a flow of fluid over the surface corresponding to the area for expected environmental conditions. An average of the data for the number of points is determined by the computer system. Whether the surface is flight worthy may be assessed using the surface condition information and the average of the data.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
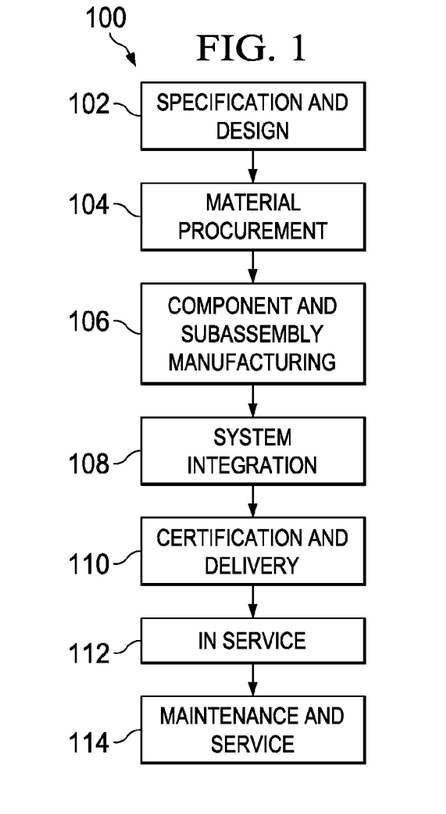
FIG. 1 is an illustration of an aerospace vehicle and spacecraft manufacturing and service method in accordance with an advantageous embodiment.
Figure 2:
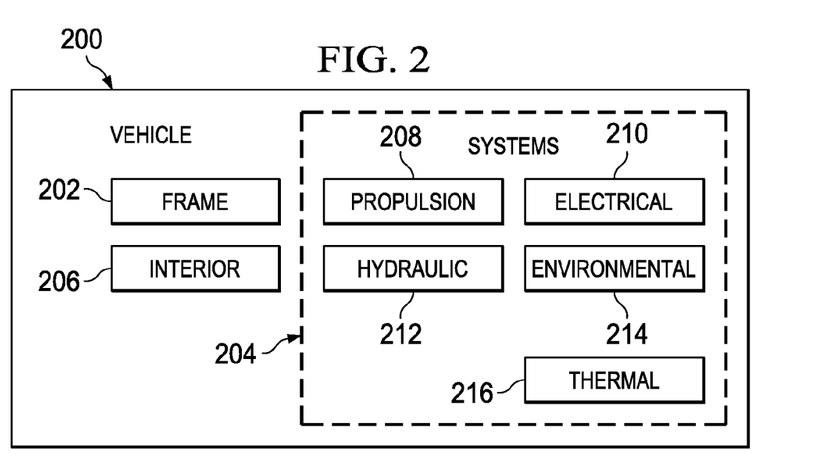
FIG. 2 is a block diagram of a vehicle in accordance with an advantageous embodiment.

Referring more particularly to the drawings, embodiments of the disclosure may be described in the context of the aerospace vehicle and spacecraft manufacturing and service method 100 as shown in FIG. 1 and vehicle 200 as shown in FIG. 2. Turning first to FIG. 1, an illustration of an aerospace vehicle and spacecraft manufacturing and service method is depicted in accordance with an advantageous embodiment. During pre-production, example aerospace vehicle and spacecraft manufacturing and service method 100 may include specification and design 102 of vehicle 200 in FIG. 2 and material procurement 104. During production, component and subassembly manufacturing 106 and system integration 108 of vehicle 200 in FIG. 2 takes place. Thereafter, vehicle 200 in FIG. 2 may go through certification and delivery 110 in order to be placed in service 112. While in service by a customer, vehicle 200 in FIG. 2 is scheduled for routine maintenance and service 114, which may include modification, repair, reconfiguration, refurbishment, and other maintenance or service.

Each of the processes of aerospace vehicle and spacecraft manufacturing and service method 100 may be performed or carried out by a system integrator, a third party, and/or an operator. In these examples, the operator may be a customer. For the purposes of this description, a system integrator may include, without limitation, any number of aerospace vehicle and spacecraft manufacturers and major-system subcontractors. A third party may include, without limitation, any number of venders, subcontractors, and suppliers. An operator may include, without limitation, a company, a military entity, a service organization, and so on.

With reference now to FIG. 2, an illustration of a vehicle is depicted in which an advantageous embodiment may be implemented. For example, vehicle 200 may be an aerospace vehicle or a spacecraft. In this illustrative example, spacecraft 200 is produced by aerospace vehicle and spacecraft manufacturing and service method 100 in FIG. 1. Vehicle 200 may include frame 202 with a plurality of systems 204 and interior 206.

Examples of plurality of systems 204 include one or more of propulsion system 208, electrical system 210, hydraulic system 212, environmental system 214, and thermal protection system 216. Although an aerospace example is shown, different advantageous embodiments may be applied to other industries, such as the automotive industry.

The different advantageous embodiments recognize and take into account a number of different considerations. For example, the different advantageous embodiments recognize and take into account that aerodynamic heating analysis of a body requires information describing the flow of fluid across a surface of the body. This information may be available in the form of computational fluid dynamics data. Computational fluid dynamics data is generated by computer simulation of a flow of fluid over the surface of the body. Computational fluid dynamics data is calculated for many points in areas defined on the surface.

The different advantageous embodiments also recognize and take into account that aerodynamic heating analysis may employ thermal models of a body. These models define the thermal characteristics of masses represented by two-dimensional areas across the surface of the body. However, there is not a one-to-one correspondence between the areas used for aerodynamic heating analysis and the data points generated by computational fluid dynamics simulation. Many points of computational fluid dynamics data may be generated for a single area modeled for aerodynamic heating analysis. For example, computational fluid dynamics data may be generated for points separated by a few inches across a surface. A thermal model of the same surface may model the thermal conditions for areas of the surface that are a number of feet across. Thus, computational fluid dynamics data is not directly compatible for use in aerodynamic heating analysis using a thermal model.

The different advantageous embodiments recognize and take into account that currently fluid flow data for use in aerodynamic heating analysis is obtained manually from available computational fluid dynamics data. For example, currently a skilled technician will visually inspect available computational fluid dynamics data for an area for which an aerodynamic heating analysis is to be performed. This area may include many points of computational fluid dynamics data. From this available data, the technician will select manually the data to be used in the aerodynamic heating analysis. For example, the technician may select data from one point in the area as being representative of computational fluid dynamics data across the area. Alternatively, the technician may mentally summarize the computational fluid dynamics data for many points in the area to derive the data to be used for the aerodynamic heating analysis.

The different advantageous embodiments recognize and take into account that current manual methods for obtaining fluid flow data for use in aerodynamic heating analysis have limitations. For example, manual selection of data is time consuming. Furthermore, manual selection of data may not always result in optimal data selection. Manual data selection relies on the skill of technicians for extracting computational fluid dynamics data for use in an aerodynamic heating analysis. Thus, the accuracy and consistency of aerodynamic heating analysis relying on such a method for data selection is limited.

The different advantageous embodiments recognize and take into account the desirability of fast and accurate aerodynamic heating analysis. For example, fast and accurate aerodynamic heating analysis is particularly desirable for aerospace vehicle operations. Fast and accurate aerodynamic heating analysis may be desired to determine the effects of features or anomalies on a vehicle thermal protection system in order to make timely and accurate repairs.

It would be advantageous to enable effective repairs to be made to correct such features or anomalies before, during, and after operation of aerospace vehicles. It also would be advantageous to enable such repairs in a way that minimizes the time required to assess various repair approaches and which maximizes the accuracy of the design for such repairs. Another advantageous capability would be to increase the precision with which such repairs can be designed and affected in short time periods. Such advantageous capabilities are especially important for operational and in use aerospace vehicles.

For example, consider the case of any type of orbital aerospace vehicle that has ascended to orbit, and for which such undesirable features or anomalies are discovered. Such missions have strict time limitations due to airframe limitations and limited fuel and crew provisions. Accordingly, whenever possible, it is imperative that a repair be designed and effected on-orbit as quickly as possible so as not to jeopardize the mission success.

Any such repair typically may be made after an analysis of the thermal protection system in the context of the operational environment, including the reentry environment. That analysis may include, among other considerations, a rapid but effective analysis of the airstream flow over the thermal protection system. Such reentry and operational airstream data for aerospace vehicles often is available in computational fluid dynamics performance libraries and databases for the larger aerospace vehicle. Such libraries may contain computational fluid dynamics data for many points across the surface of the vehicle. However, for a rapid and effective repair, specific subsets of the computational fluid dynamics performance data must be identified in order for an accurate aerodynamic heating analysis to be made.

Furthermore, the different advantageous embodiments also recognize and take into account that the inherent inaccuracy of selecting computational fluid dynamics data manually for use in aerodynamic heating analysis is recognized by designers of thermal protection systems and other aerospace vehicle components. This situation causes aerospace vehicle components to be designed with higher aerodynamic heating thresholds than would be needed if more accurate calculations could be performed.

Obtaining accurate data for use in aerodynamic heating analysis presents a technical problem. Computational fluid dynamics data is available for use in aerodynamic heating analysis, but it is not available in a useful form. Currently, non-technical manual methods are used to obtain the fluid flow parameter data for use in aerodynamic heating analysis from such computational fluid dynamics data. However, this technical problem calls for a technical solution in which aerodynamic heating analysis may be performed more rapidly, accurately, and consistently in an automated manner.

Thus, the advantageous embodiments provide a technical method and apparatus for generating fluid flow parameter data for use in aerodynamic heating analysis. For example, in accordance with an advantageous embodiment computational fluid dynamics data is generated for a number of points in an area on a surface to be analyzed. Sub-areas are identified. For example, the sub-areas may correspond to areas of the surface for which an aerodynamic heating analysis is to be performed. Responsive to identifying the sub-areas, a computer system automatically determines a sub-set of the number of points corresponding to each of the number of sub-areas. The computer system then determines a value for each of the number of sub-areas using the data for the sub-set of points corresponding to each of the number of sub-areas. The value is determined by the computer system automatically as an average of the data for the sub-set of points corresponding to each of the number of sub-areas. The resulting accurately determined computational fluid dynamics parameter values then may be used to perform a more accurate aerodynamic heating analysis. Changes to the surface may be made in response to the results of such an accurate aerodynamic heating analysis. For example, the results may be used to change the surface design or to affect a repair of the surface.

Figure 3:
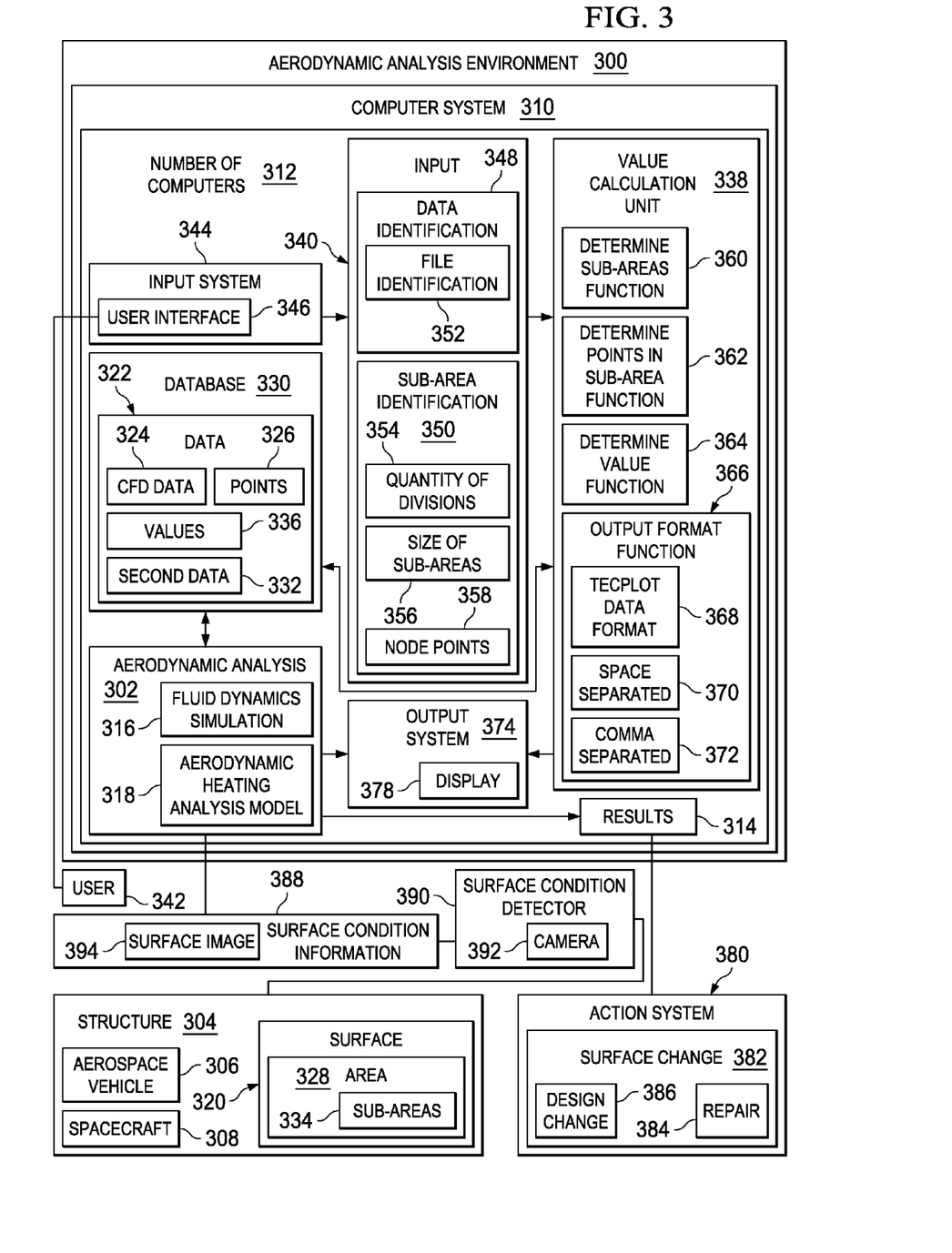
FIG. 3 is a block diagram of an aerodynamic analysis environment in accordance with an advantageous embodiment.

With reference now to FIG. 3, an illustration of an aerodynamic analysis environment is depicted in accordance with an advantageous embodiment. Aerodynamic analysis environment 300 may be used to perform aerodynamic analysis 302 on structure 304. For example, structure 304 may be vehicle 200 in FIG. 2. Alternatively, structure 304 may be a portion of vehicle 200 in FIG. 2. Structure 304 may be aerospace vehicle 306 or spacecraft 308. Alternatively, structure 304 may be a portion of aerospace vehicle 306 or spacecraft 308. For example, structure 304 may be a portion of a thermal protection system for aerospace vehicle 306 or spacecraft 308. Aerospace vehicle 306 may be a conventional aircraft.

In this illustrative example, aerodynamic analysis environment 300 comprises computer system 310. Computer system 310 includes number of computers 312 in this example. When more than one computer is present in number of computers 312, number of computers 312 may be in communication with each other using wired and wireless communication links. These links may be in a network or other communications system.

In accordance with an advantageous embodiment, aerodynamic analysis environment 300 may be implemented as a ground based system, as a vehicle based system, or as a system with the various functions thereof distributed between ground and vehicle subsystems. For example, without limitation, one or more functions of aerodynamic analysis environment 300 may be implemented on-board an aerospace vehicle or spacecraft. An on-board aerodynamic analysis environment of this type may be used for aerodynamic analysis of a vehicle structure while the vehicle is in operation.

Aerodynamic analysis 302 runs in number of computers 312. Alternatively, aerodynamic analysis 302 may be performed by an aerodynamic analyzer. Aerodynamic analysis 302 generates results 314. Results 314 may be used to determine whether changes are needed to structure 304. For example, results 314 may be used to determine whether maintenance or redesign of structure 304 is needed.

Aerodynamics analysis 302 includes fluid dynamics simulation 316 and aerodynamic heating analysis model 318. Fluid dynamics simulation 316 is a computer simulation of fluid flow over surface 320 of structure 304. Fluid dynamics simulation 316 generates data 322. Thus, data 322 may be computational fluid dynamics data 324. For example, data 322 may include values for various computational fluid dynamics properties such as temperature, pressure, heat flux, velocity, and others. Data 322 is generated for number of points 324 in area 326. For example, area 326 may be a two-dimensional planar area on surface 320 of structure 304. Data 322 may be stored in database 330. Database 330 may be implemented using any form of database, data structure, or file format for storing data 322 in computer system 310. Alternatively, database 330 may be implemented separate from, but accessible by, computer system 310.

Aerodynamic heating analysis model 318 is used to provide a computer simulation of the heating of structure 304 by fluid flow over surface 320 of structure 304. A simulation using aerodynamic heating analysis model 318 generates second data 332. Second data 332 is generated for number of sub-areas 334 of area 328. Sub-areas 334 correspond to portions of area 328. As will be discussed in more detail below, each of sub-areas 334 includes a number of points 326. Second data 332 also may be stored in database 330. Results 314 may include data 322, second data 332, or both data 322 and second data 332.

A simulation using aerodynamic heating analysis model 318 requires the use of values 336. Values 336 are fluid flow parameter values for sub-areas 334. In accordance with advantageous embodiment, values 336 are generated from data 322 by value calculation unit 338.

Value calculation unit 338 is configured to receive input 340 from user 342. User 342 may be a human user. Alternatively, user 342 may be a machine user or a human user acting in combination with a machine user.

User 342 may provide input 340 via input system 344. Input system 344 may be implemented in a known manner for providing input 340 from user 342 into computer system 310. For example, input system 344 may include known input devices such as a keyboard or mouse in combination with a display device.

Input system 344 provides user interface 346 for user 342. User interface 346 facilitates the entry of input 340 by user 342. For example, user interface 346 may prompt user 342 to enter the required input 340. User interface 346 may include a graphical user interface.

Input 340 includes data identification 348 and sub-area identification 350. Data identification 348 identifies data 322 to be used by value calculation unit 338. For example, data identification may be file identification 352. File identification 352 identifies a data file containing data 322 to be used by value calculation unit 338.

Sub-area identification 350 identifies a number of sub-areas 334 within area 328. For example, sub-area identification 350 may identify a number of sub-areas for which a simulation using aerodynamic heating analysis model 318 is to be performed. In accordance with an advantageous embodiment, user 342 may provide sub-area identification 350 in several ways. For example, sub-area identification 350 may be provided as quantity of divisions 354, size of sub-areas 356, or node points 358.

Quantity of divisions 354 identifies sub-areas 354 by identifying a quantity of divisions in which area 328 is to be divided to form sub-areas 334. Size of sub-areas 356 identifies sub-areas by defining a size of the sub-areas in which area 328 is to be divided to form sub-areas 334. Node points 358 identifies sub-areas 334 by identifying the location of note points 358 in area 328 corresponding to the locations of sub-areas 354. For example, node points 358 may be entered using two dimensional coordinates to identify the location of node points 358 in area 328.

Value calculation unit 338 is configured to implement determine sub-areas function 360. Determine sub-areas function 360 determines the extent of sub-areas 334 within area 328. Determine sub-areas function 360 is responsive to sub-area identification 350 provided by user 342. Operation of determine sub-areas function 360 depends on how sub-area identification 350 is provided. If sub-area identification 350 is provided as quantity of divisions 354, determine sub-areas function 360 determines sub-areas 334 by dividing area 328 into the specified quantity of divisions. If sub-area identification 350 is provided as size of sub-areas 356, determine sub-areas function 360 determines sub-areas 334 by dividing area 328 into sub-areas 334 having the specified size. If sub-area identification 350 is provided as node points 358, determine sub-areas function 360 determines sub-areas 334 by dividing area 328 into sub-areas 334 centered on the identified node points 358. In any case, determine sub-areas function 360 may use known geometric calculations to determine sub-areas 334 from sub-area identification 350.

Value calculation unit 338 also is configured to implement determine points in sub-area function 362. Determine points in sub-area function 362 determines points 326 in each sub-area 334 of area 328 as determined by determine sub-areas function 360. Thus, determine points in sub-area function 362 is responsive to the determination of the extent of sub-areas 334 in area 328 by determine sub-areas function 360.

Value calculation unit 338 further is configured to implement determine values function 364. Determine values function 364 calculates values 336 for sub-areas 334. Determine values function 364 is responsive to points 326 determined to be in sub-areas 334 by determine points in sub-area function 362. As discussed above, data 322 includes parameter values for each of points 326. Determine values function calculates values 336 as the average values of data 322 for the points determined to be in sub-areas 334. For example, determine values function 364 may add together the parameter values for a given parameter for each of points 326 in each of sub-areas 334. The resulting sum is then divided by the quantity of points 326 in each of sub-areas 334. The result is values 336 for sub-areas 334. Values 336 calculated by determine values function 364 may be saved in database 330.

Values 336 determined by determine values function 364 may be provided as output in a variety of forms. For example, output format function 366 may format values 336 in Tecplot data format 368, space separated 370, or comma separated 372. Values 336 may be saved in database 330 in the desired format. Values 336 also or alternatively may be displayed in the desired format via output system 374. Output system 374 may be implemented in a known manner for displaying output from computer system 310 to user 342. For example, output system 374 may include display 378 on which values 336 are displayed to user 342.

Values 336 also may be used in an aerodynamic heating simulation using aerodynamic heating analysis model 318 to generate second data 332. Second data 332 also may be presented to user 342 on display 378. Since the fluid flow parameter values 336 used in such a simulation were accurately generated from data 322 in accordance with an advantageous embodiment, the resulting aerodynamic heating data is also accurate and reliable. Furthermore, value calculation unit 338 also operates automatically to calculate the accurate values 336 quickly.

Aerodynamic analysis environment 300 may be an aerodynamic condition analyzer. In this case, aerodynamic analysis environment 300 may analyze a condition of surface 320 for use by action system 380. Action system 380 may implement or initiate surface change 382 responsive to results 314 generated by aerodynamic analysis environment 300. Surface change 382 may include any change to surface 320 as a response to results 314. For example, results 314 may indicate that surface 320 should be repaired. In this case, surface change 382 may include repair 384. Alternatively, results 314 may indicate that surface 320 should be redesigned. In this case, surface change 382 may include design change 386.

For operation as an aerodynamic condition analyzer, aerodynamic analysis environment 300 may receive surface condition information 388. Surface condition information 388 may include any information describing the physical characteristics of surface 320. Surface condition information may be provided by surface condition detector 390. Surface condition detector 390 may be any device or system for generating or otherwise providing surface condition information 388.

For example, in an operational environment, surface condition detector 390 may include camera 392. Camera 392 provides surface condition information 388 in the form of surface image 394. Surface image 394 is an image of surface 320. For example, surface image 394 may reveal a feature or anomaly in the surface of the thermal protection system of aerospace vehicle 306 or spacecraft 308.

In another example, surface condition information 388 may include design information. For example, surface condition information 388 may include information describing physical characteristics of the current design of the thermal protection system for aerospace vehicle 306 or spacecraft 308.

In accordance with an advantageous embodiment, aerodynamic heating characteristics of surface 320 may be determined by a computer simulation of surface 320 as defined by surface condition information 388. In this case, a computer simulation using aerodynamic heating analysis model 318 may employ both surface condition information 388 and values 336 to generate second data 332 for current surface conditions as indicated by surface condition information 388.

This second data 332 may be provided as results 314 to action system 380. For example, results 314 may include an assessment of whether surface 320 is flight worthy based on expected environmental conditions, such as environmental conditions associated with spacecraft reentry. In turn, action system 380 may implement or initiate surface change 382 in response to such results 314. For example, second data 332 may indicate that aerodynamic heating characteristics resulting from a feature or anomaly in the thermal protection system of aerospace vehicle 306 or spacecraft 308 require a repair or redesign of the thermal protection system. In this example, surface change 382 may include repair 384 of the thermal protection system or design change 386 to the thermal protection system, as the case may be.

The illustration of aerodynamic analysis environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, structure 304 may take forms other than aerospace vehicle 306 or spacecraft 308. For example, structure 304 may be a surface of an aircraft, a ground vehicle, a car, a train, or some other suitable structure or component thereof. Structure 304 may be any structure, made of any material, for which an aerodynamic heating analysis is to be conducted.

In some advantageous embodiments, data 322, second data 332, and values 336 may be stored in the same or in different databases or data structures. For example, data 322, second data 332, and values 336 may be stored in separate data files in memory or other storage devices. In some advantageous embodiments, data 322, second data 332, and values 336 may be stored in the same or in separate memory or other storage devices. Such memory or other storage devices may be part of computer system 310. Alternatively, such memory or other storage devices may be remote from, but accessible by, computer system 310.

In some advantageous embodiments data 322 may be generated in advance for later use in a simulation using aerodynamics heating analysis model 318. For example, data 322 may be generated by running fluid dynamics simulation 316 in advance of an operational mission of aerospace vehicle 306 or spacecraft 308. Data 322 then may be used to generate values 336 for use in a simulation using aerodynamic heating analysis model 318 during the operational mission.

Furthermore, in some advantageous embodiments, fluid dynamics simulation 316 may be implemented in a separate computer system from value calculation unit 338 and from aerodynamic heating analysis model 318. In other advantageous embodiments, value calculation unit 338 may be implemented in a separate computer system from aerodynamic heating analysis model 318.

In some advantageous embodiments, values 336 may be used as input for aerodynamic analysis other than aerodynamic heating analysis using aerodynamic heating analysis model 318. For example, values 336 may be used as input for any type of aerodynamic analysis where average fluid flow parameter values for areas containing fluid flow parameter values for multiple points are used.

Figure 4:
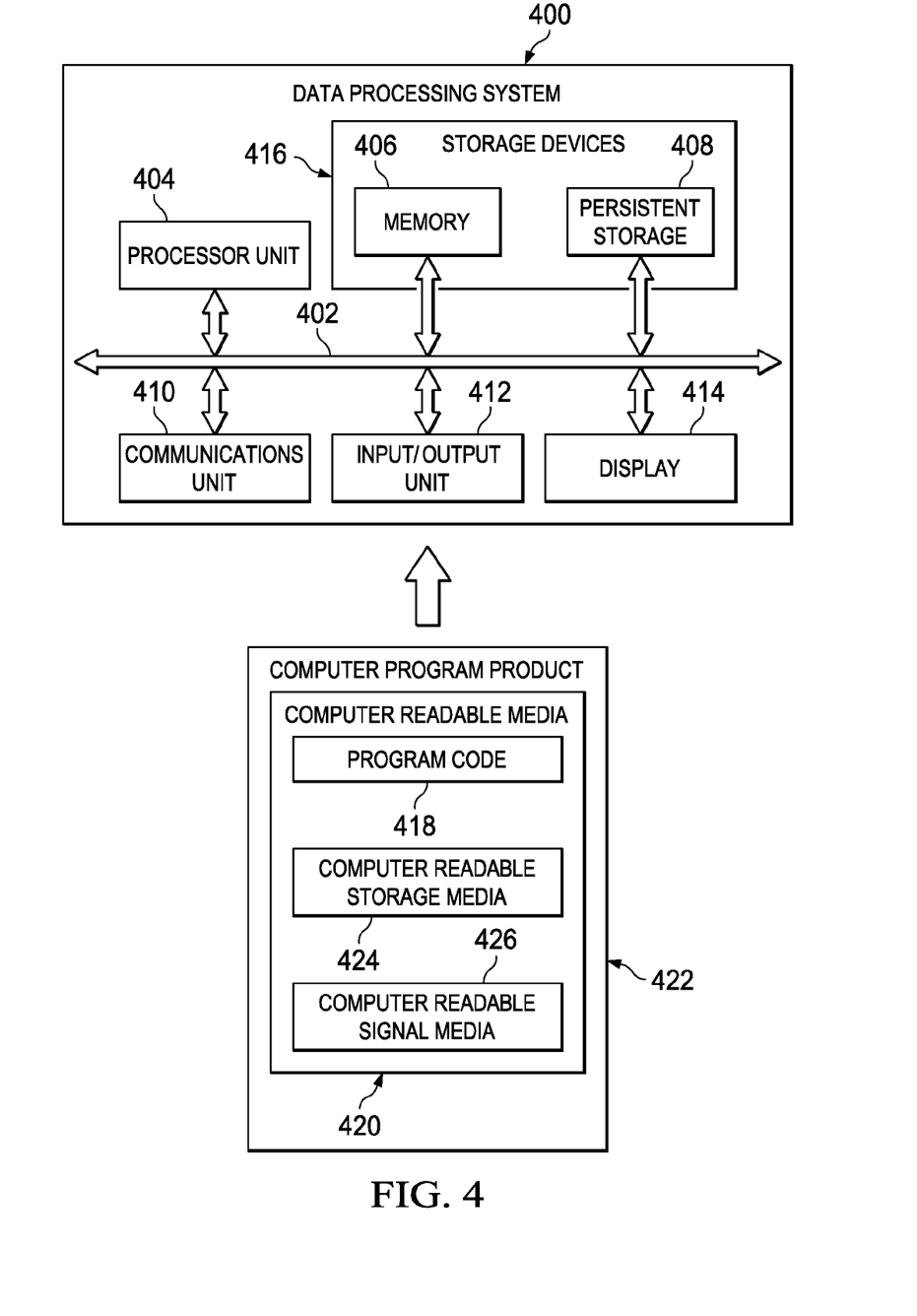
FIG. 4 is an illustration of a data processing system in accordance with an advantageous embodiment.

Turning now to FIG. 4, an illustration of a data processing system is depicted in accordance with an advantageous embodiment. In this advantageous example, data processing system 400 is an example of one implementation of computer system 310 of FIG. 3. In this advantageous example, data processing system 400 includes communications fabric 402. Communications fabric 402 provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems, in which a main processor is present with secondary processors on a single chip.

As another advantageous example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory, or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426. Computer readable storage media 424 may include, for example, an optical or magnetic disc that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory that is connected to data processing system 400. In some instances, computer readable storage media 424 may not be removable from data processing system 400. Computer readable storage media 424 specifically excludes pure signals.

Alternatively, program code 418 may be transferred to data processing system 400 using computer readable signal media 426. Computer readable signal media 426 may be, for example, a propagated data signal containing program code 418. For example, computer readable signal media 426 may be an electro-magnetic signal, an optical signal, and/or any other suitable type of signal. These signals may be transmitted over communication links, such as wireless communication links, an optical fiber cable, a coaxial cable, a wire, and/or any other suitable type of communication link. In other words, the communication link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to, or in place of, those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
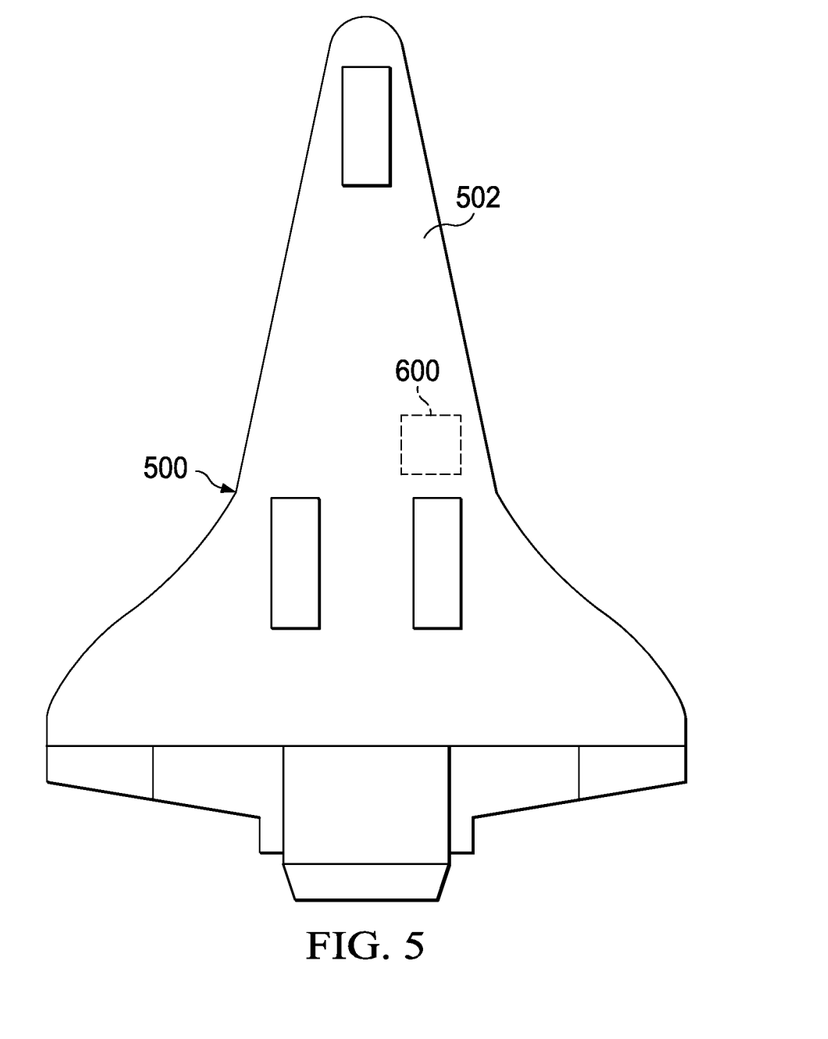
FIG. 5 is an illustration of a space shuttle in accordance with an advantageous embodiment.

With reference now to FIG. 5, an illustration of a space shuttle is depicted in which an advantageous embodiment may be implemented. In this example, space shuttle 500 is one example of vehicle 200 in FIG. 2. FIG. 5 illustrates lower surface 502 of space shuttle 500.

Figure 6:
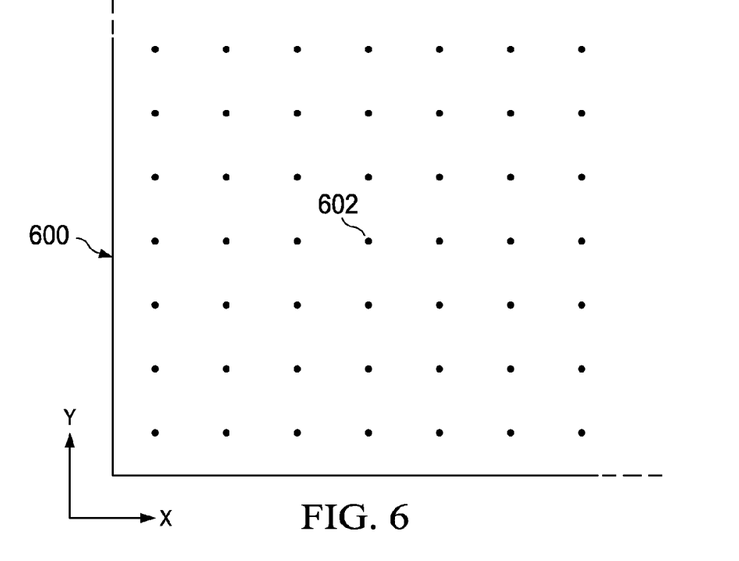
FIG. 6 is a schematic illustration of data points for an area corresponding to a portion of the lower surface of the space shuttle of FIG. 5 in accordance with an advantageous embodiment.

With reference now to FIG. 6, a more detailed illustration of a portion of area 600 of lower surface 502 of space shuttle 500 in FIG. 5 is depicted. In accordance with an advantageous embodiment, computational fluid dynamics data may be calculated for area 600. Such a calculation results in fluid flow parameter values for each of many points 602 across area 600.

Figure 7:
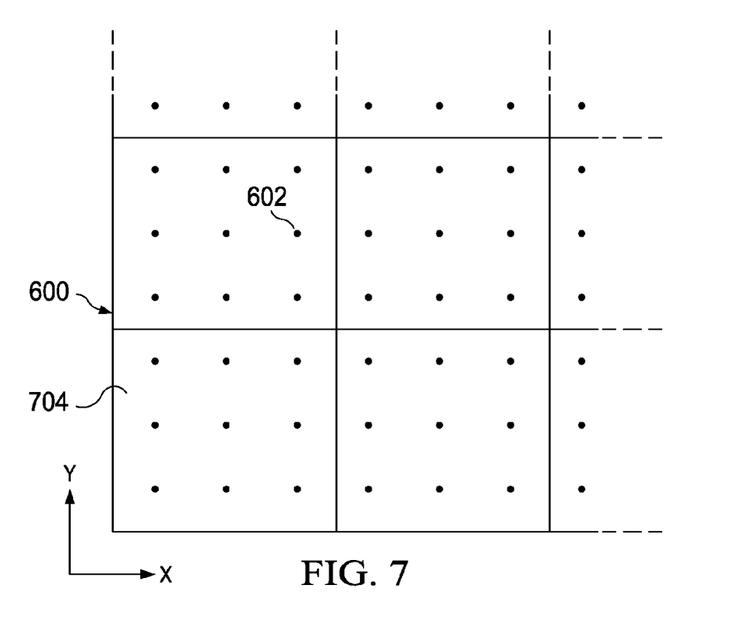
FIG. 7 illustrates determining sub-areas and data points in the sub-areas in accordance with an advantageous embodiment.

With reference now to FIG. 7, an illustration of sub-areas and data points in the sub-areas in accordance with an advantageous embodiment is depicted. In FIG. 7, area 600 of FIG. 6 is divided into a number of sub-areas 704. Each sub-area includes a number of points 602. In this example, each sub-area 704 includes the same quantity of points 602. In other embodiments, each sub-area may include more or fewer points 602. Furthermore, in other embodiments, sub-areas may not all include the same number of points 602.

Figure 8:
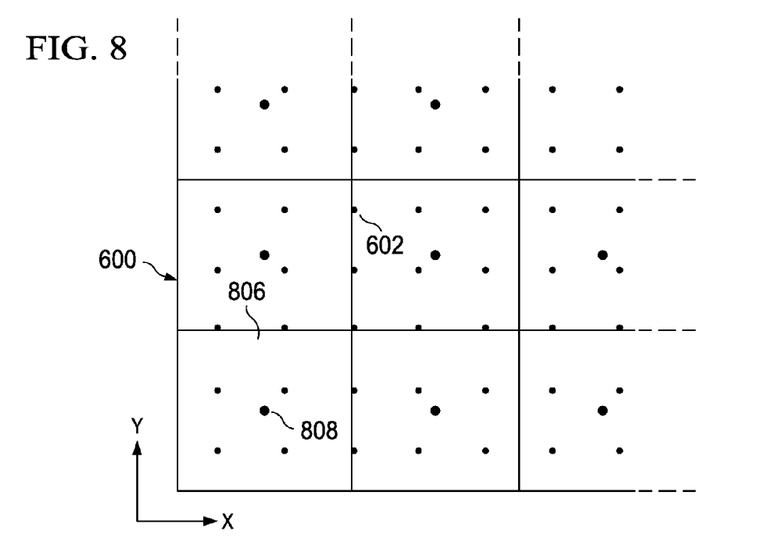
FIG. 8 illustrates determining a number of sub-areas and data points in the number of sub-areas in accordance with another advantageous embodiment.

With reference now to FIG. 8, an illustration of sub-areas and data points in the sub-areas in accordance with another advantageous embodiment is depicted. In FIG. 8, area 600 of FIG. 6 is divided into a number of sub-areas 806. In this example, each sub-area 806 is defined by a node point 808. Each node point 808 is at the center of a sub-area 806. In this example, the various sub-areas do not all include the same number of points 602.

As discussed above, the location of each node point 808 in area 600 may be defined by a two-dimensional coordinate. Sub-areas may be defined around each node point by locating the next adjacent node point or the edge of area 600 in each X-direction and each Y-direction for each node point. The boundary for each sub-area then is defined by the halfway distance to the next adjacent node point in each X-direction and each Y-direction, or by the edge of area 600 if there is no other node point between the node point and the edge in a particular direction.

Figure 9:
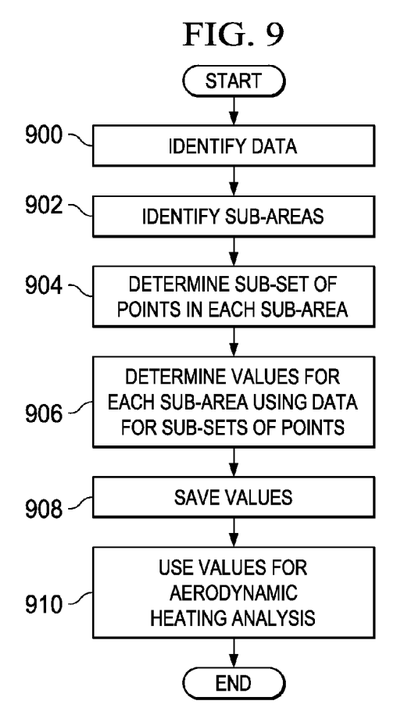
FIG. 9 is a flowchart of a method for determining average computational fluid dynamic values for sub-areas in accordance with an advantageous embodiment.

A process for calculating average computational fluid dynamics values for sub-areas in accordance with an advantageous embodiment is described now with reference to the flowchart diagram of FIG. 9. The process described may be implemented in aerodynamic analysis environment 300 of FIG. 3.

The process begins with identifying data to be used (operation 900). For example, operation 900 may include identifying a data file containing data generated by a computer simulation of a fluid flow over a surface for expected environmental conditions. The identified data includes data for a number of points in an area.

Sub-areas of the area then are identified (operation 902). Operation 902 may include identifying sub-areas by identifying a quantity of divisions of the area, by identifying a size of the sub-areas, or by identifying the location of node points in the area. Operation 902 includes determining the extent of sub-areas within the area. If sub-areas are identified as a quantity of divisions, the extent of sub-areas is determined by dividing the area into the specified quantity of divisions. If sub-areas are identified by a size of sub-areas, the extent of sub-areas is determined by dividing the area into sub-areas having the specified size. If the sub-areas are identified by node points, the extent of the sub-areas is determined by dividing the area into sub-areas centered on the identified node points. Once the sub-areas are identified, the sub-set of points contained in each sub-area are determined (operation 904).

From the sub-sets of points determined in operation 904 values for each sub-area are calculated using the data for the sub-set of points in each sub-area (operation 906). In accordance with an advantageous embodiment, operation 906 includes calculating each value as an average of the data values for the sub-set of points in each sub-area.

The calculated values then may be saved (operation 908). For example, operation 908 may include saving the values in a desired format in a database.

The calculated values may be used for an aerodynamic heating analysis (operation 910). For example, operation 910 may include providing the calculated values as input for a computer simulation using an aerodynamic heating model.

Figure 10:
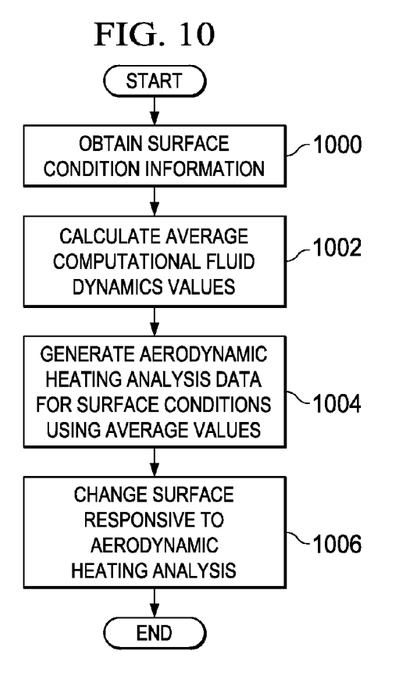
FIG. 10 is a flowchart of a method for analyzing and changing a surface in accordance with an advantageous embodiment.

A process for analyzing and changing a surface in accordance with an advantageous embodiment is described now with reference to FIG. 10. The process described may be implemented in aerodynamic analysis environment 300 in FIG. 3.

The process begins with obtaining surface condition information (operation 1000). Operation 1000 may include obtaining information describing the current physical condition of a surface. The surface condition information may be obtained using a surface condition detector. For example, operation 1000 may include obtaining surface condition information in the form of an image of the surface using a surface condition detector in the form of a camera.

Average computational fluid dynamics values for the surface are calculated (operation 1002). For example, operation 1002 may include steps 900-908 of the process described above with reference to FIG. 9.

Aerodynamic heating analysis data for the surface then is generated (operation 1004). Operation 1004 may include generating data by a computer simulation of the current condition of the surface as defined by the surface condition information obtained in operation 1000 using an aerodynamic heating analysis model and the average computational fluid dynamics values provided in operation 1002. Operation 1004 may include assessing whether the surface is flight worthy based on expected environmental conditions.

The surface then is changed responsive to the results of the aerodynamic heating analysis (operation 1006). For example, operation 1006 may include implementing or initiating a repair or design change to the surface using the aerodynamic heating analysis data provided in operation 1004.

One or more of the advantageous embodiments provides a capability to generate fluid flow parameter data for use in aerodynamic heating analysis. For example, in accordance with an advantageous embodiment, computational fluid dynamics data is generated for a number of points in an area on a surface to be analyzed. Sub-areas corresponding to areas of the surface for which an aerodynamic heating analysis is to be performed are identified. A computer system automatically determines a sub-set of the number of points corresponding to each of the number of sub-areas. The computer system then determines a value for each of the number of sub-areas using the data for the sub-set of points corresponding to each of the number of sub-areas. The value is determined by the computer system automatically as an average of the data for the sub-set of points corresponding to each of the number of sub-areas. The resulting accurately determined parameter values then may be used to perform a more accurate aerodynamic heating analysis.

As will be appreciated by one skilled in the art, advantageous embodiments may be embodied as a system, method or computer program product. Accordingly, advantageous embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the advantageous embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with any system, apparatus, or device for running a program. A computer readable storage medium specifically excludes mere propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with any system, apparatus, or device for running a program.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described with reference to flowchart illustrations and/or block diagrams of methods, apparatus (systems) and computer program products according to various illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. A number, as used herein with reference to items, means one or more items. For example, a number of integrated circuits means one or more integrated circuits.

The corresponding structures, materials, acts, and equivalents of all means or step plus function elements in the claims below are intended to include any structure, material, or act for performing the function in combination with other claimed elements as specifically claimed.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of aerodynamic analysis of a surface of an aircraft, comprising:
    receiving into a computer system surface condition information of the surface, the surface condition information being from a surface condition detector and comprising a surface image of the surface obtained from a camera;
    identifying data by the computer system, the data including data for a number of points in an area of the surface, wherein the data is computational fluid dynamics data generated by a computer simulation of a flow of fluid over the surface corresponding to the area for expected environmental conditions;
    determining by the computer system an average of the data for the number of points; and
    assessing whether the surface is flight worthy using the surface condition information and the average of the data.

2. The method of claim 1, wherein the area corresponds to a portion of the surface comprising an anomaly in the surface.

3. The method of claim 1 further comprising changing the surface responsive to assessing whether the surface is flight worthy.

4. The method of claim 3, wherein changing the surface comprises one of changing a design of the surface or repairing the surface.

5. The method of claim 1, wherein assessing whether the surface is flight worthy comprises generating second data using a computer model of thermal conditions at the surface corresponding to the area.

* * * * *